Sept. 12, 1939.　　　M. F. A. JULIEN　　　2,172,706
SUSPENSION OF VIBRATING BODIES
Filed Nov. 21, 1936　　　4 Sheets-Sheet 1

M. F. A. Julien, Inventor

By Glascock Downing & Seebold, Attys.

Sept. 12, 1939.   M. F. A. JULIEN   2,172,706
SUSPENSION OF VIBRATING BODIES
Filed Nov. 21, 1936   4 Sheets-Sheet 2

M. F. A. Julien, Inventor
By Glascock Downing & Seebold

Sept. 12, 1939.    M. F. A. JULIEN    2,172,706
SUSPENSION OF VIBRATING BODIES
Filed Nov. 21, 1936        4 Sheets-Sheet 3

Sept. 12, 1939.   M. F. A. JULIEN   2,172,706
SUSPENSION OF VIBRATING BODIES
Filed Nov. 21, 1936   4 Sheets-Sheet 4

M. F. A. Julien
INVENTOR

By Glascock Downing Seebold
Attys.

Patented Sept. 12, 1939

2,172,706

UNITED STATES PATENT OFFICE 2,172,706

SUSPENSION OF VIBRATING BODIES

Maurice François Alexandre Julien, Paris, France

Application November 21, 1936, Serial No. 112,184
In France September 19, 1936

5 Claims. (Cl. 248—5)

The present invention relates to improvements in the suspension of motors, engines, pumps or other vibrating machines, particularly where it is desired to allow the machine freedom of movement in one plane with a consequent reduction of movement in other planes or directions.

To this end the machine is connected to its mounting by certain means imposing the same geometrical connections as a certain number of connecting links, substantially parallel to one another and of the same length, which would be articulated at each of their extremities, upon the vibrating body and upon the framework, by means such as a universal joint or a ball-and-socket joint, and in addition the desired resilient reaction, recoil or return means are arranged for sustaining the machine in relation to the framework; the means playing the part of links, just described, assuming them to have a certain resilience, give the equivalent of an elongation or of a shortening of the said connecting links in the course of certain displacements.

In the annexed drawings, examples of principle and construction of the invention are illustrated, in which.

Figure 1:
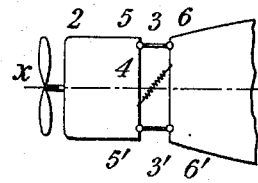
Figures 1 to 6 are diagrams in explanation of the principles of the invention.

In the diagrammatic view shown in Figure 1 will be seen at 1 the framework of an aeroplane fuselage supporting the engine or vibrating body 2 of an aircraft engine provided with a propeller. Links 3, 3' are articulated at 5, 5' to the engine 2, and at 6, 6' to the framework 1. A resilient member 4 keeps the engine 2 at a suitable level relatively to its framework 1.

Figure 2:
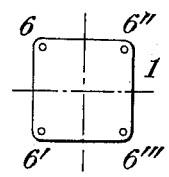

Figure 2 shows the face of the framework 1 of Figure 1, where four points of attachment are made as indicated at 6, 6', 6'', 6'''.

Figure 3:
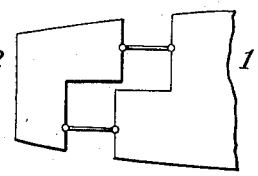

Figure 3 is a modification of Figure 1, and shows that it is not necessary that all the points of attachment 6, 6'. . . to the framework and 5, 5'. . . to the engine or vibrating body should be in the same plane perpendicular to the direction of the links. It will in fact be seen from Figure 3 that there may be a displacement between the top and the bottom of the framework and of the engine or vibrating body.

Figure 4:
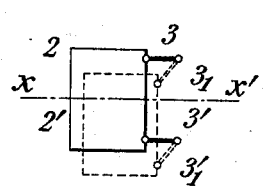

Figure 4 shows at 2', in dot-and-dash lines, a new position of the body 2, at the time of a simple movement of translation, whilst the links 3, 3' . . . remain parallel to one another.

Figure 5:
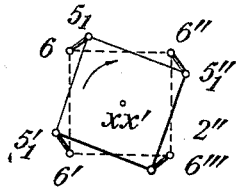

In Figure 5, on the contrary, which is a diagrammatic end view, a new position 2'' will be seen, in dot-and-dash lines, of the framework 2, after a movement of rotation leaving the axis XX' constant. It has been assumed in this figure that there were four links, the points of attachment of which occupy the corners of a square. The corners 6, 6', 6'', 6''' on the framework have not moved while the corners 5, 5' . . . now occupy the new positions $5_1$, $5_1'$, $5_1''$, $5_1'''$.

It must be observed that if the four points of attachment are arranged otherwise than on the corners of a square, a movement of pure rotation would be impossible, owing to the links being assumed to be rigid. Moreover even in the case of an exactly symmetrical arrangement of the points of attachment of the links, any movement of the engine or vibrating body relative to the framework comprising at the same time a translation and a rotation is impossible for the same reason.

The resilient member such as 4 should be upon the mountings of Figures 2 to 5, but have not been shown, in order to avoid confusing these entirely diagrammatic representations.

Figure 6:
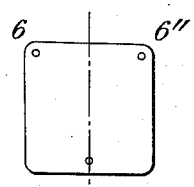

In order to render the movements of translation and of rotation of the body 2 compatible, in a plane perpendicular to the mean direction of the links, the mounting represented in Figure 6 will be adopted, which consists simply in reducing the number of links to three. Figure 6 shows the face of the framework, with the three points of articulation of the links at 6, 6', 6''. In this arrangement the movements in question are possible, always at the price of displacements or rotation of the second order in other directions. Now in the practical applications of the invention it is not always easy to reduce the number of links to three.

According to the invention recourse is then had to links having a certain longitudinal resilience.

Figure 7:
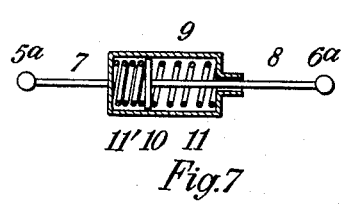
Figures 7 and 8 show two examples of construction of links of variable length.

Figure 7 shows a first type of embodiment of such a link, in the form of a complex device constituting a link of variable length. Two rods 7 and 8 terminate respectively in ball members 5a and 6a, which are intended to enter respectively the corresponding socket members 5 of the body 2 and 6 of the framework 1. The rod 7 carries a cylinder 9 analogous to a pump cylinder in which moves a piston 10, solid with the rod 8 whilst springs 11 and 11' tend to oppose the lengthening and shortening of the composite unit.

By substituting the links of Figures 4 and 5 by resilient members formed as shown in Figure 7 it is evident that the displacements of the body 2 comprising simultaneous translation and rotation, become possible due to variations in length from one link to the other, the spring 11 of each member being as a result differently compressed.

Figure 8:
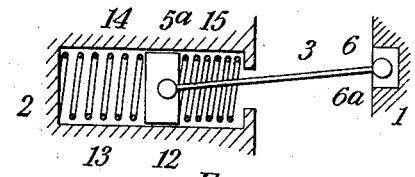

Figure 8 shows a modification of the arrangement shown in Figure 7 but is capable of functioning in substantially the same manner. The link 3 is of invariable length, but one of its ball members 5a, for example, is secured in a piston 12, which is capable of sliding in a bore 13 of the body 2, its displacements within said body being opposed in both directions by springs such as 14 and 15. In this embodiment it is the points of attachment 5, 5' . . . of the various links that are rendered movable, their displacement being equivalent to a resilient variation of length of the corresponding link.

Instead of providing this system on the point 5 it might be provided at 6, and in the body mounting, all the points 5 or all the points 6 may be equipped in this way, or the devices may be shared between points 5 and points 6.

It will be understood that this displacement of the point of application 5 (or 6) can be obtained without any new form of attachment by a more or less deformable structure of the framework 1 or of the vibrating body 2.

Figure 9:
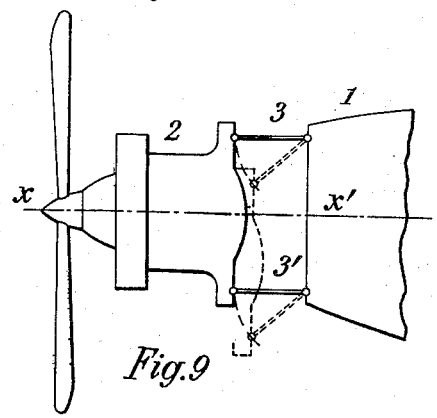
Figures 9 and 10 show diagrammatic front and end views of the mounting of an aircraft motor with radial cylinders.
Figure 10:
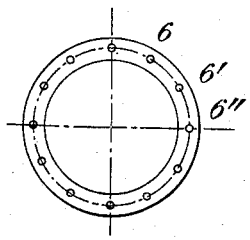
Figures 11, 12:
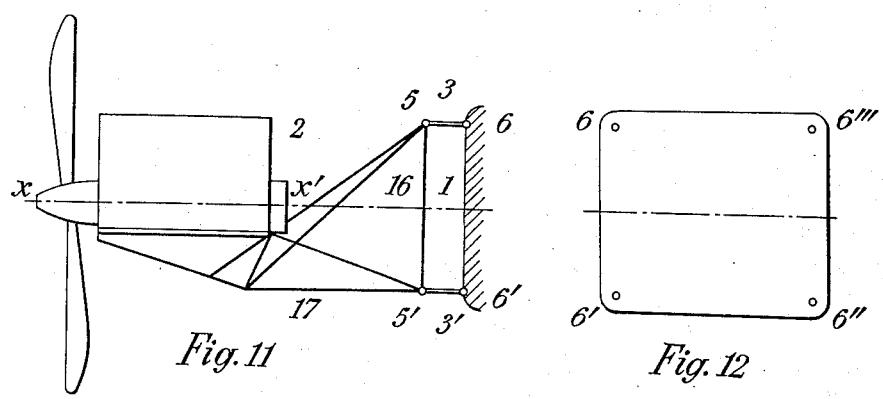
Figures 11 and 12 show analogous views with an aircraft engine on a cradle or frame.

Figures 9 and 10 show diagrammatically an example of the application of the principles of the suspension forming the subject of this invention. Figure 9 is as a whole analogous to Figure 1, with the body 2 as an aircraft engine, of a radial type, usually fixed directly to a framework 1 constituting the fuselage or an engine nacelle, and upon which the points 6 are arranged about a circumference, as shown in Figure 10. In Figures 11 and 12, a second example of the invention is shown as applied to an aircraft engine of a straight, V or other type, usually fixed to an engine cradle 17, which is in turn fixed directly to the framework 1. In this case the points of attachment 6 are provided at the corners of a rectangle, as shown in Figure 12.

According to the invention there is then obtained by the links 3 and an appropriate resilient reaction, a suspension such that the said links are substantially parallel to the axis of the crank shaft, so as to give to the engine 2 a freedom of angular oscillation about this axis and two degrees of freedom of radial oscillation perpendicularly to the direction of said axis.

In the case of Figures 11 and 12 also and where there is an engine bearer, the various points 5, 5', 5'', 5''' are connected by rigid bars such as 16, so as to constitute a closed frame.

No mention has yet been made in detail of the reaction or opposing springs which keep the vibrating body in equilibrium, jointly with the connections imposed by the links. This is because these reaction members may in fact be embodied in any means without thereby departing from the invention. There will be described hereafter particular appliances that may be adopted which combine the links and reaction members and which constitute important features of the invention.

Figures 13, 14:
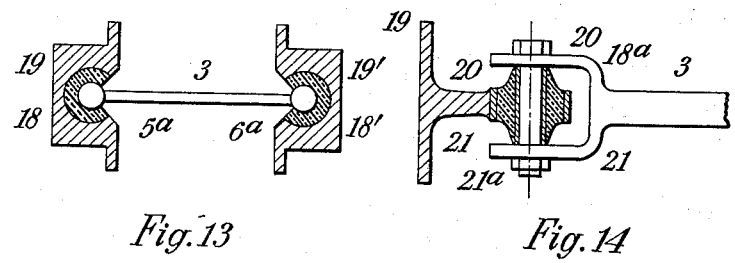
Figure 13 shows a rigid link with resilient joints.
Figure 14 shows a modification of Figure 13.

Figure 13 shows one arrangement of this kind in which the resilient members are included in the link construction and also in their manner of fixing, so as to give the longitudinal resilience necessary to the links.

The link 3 terminates in ball members 5a, 6a, each adhering to a mass of indiarubber 18, 18', respectively solid with a rigid support 19 fixed at 5 (on the vibrating body) of the preceding figures, and 19' fixed at 6 (of the frame) of the same figures.

The resilient material will preferably work in compression, in the direction of the variation in length of the links, and in shear in all the angular oscillations of the said links.

Another arrangement having the same properties is represented by Figure 14. Only one of the extremities of the link 3 is shown. A mass of indiarubber or analogous material 18a is rendered solid with two cylindrical and coaxial frames or reinforcements 20 and 21, by vulcanization or any other known process. The member 20 is integral with the link 3 through the medium of a bolt 21a, while the member 21 is solid with the support or fixing piece 19. In mounting the various links constituting a suspension with the axes of the members 20, 21, variously oriented, the reaction can be proportioned at will for the various directions of vibrations.

However, in general, if it is desired to apply the suspension according to the invention to existing engines and structures, the length that one is obliged to give to the links such as those of Figures 13 and 14 or others of the same type involves a serious disadvantage on account of the unused space taken up in length for the unit as a whole.

It is possible according to the invention to embody extremely compact and robust arrangements which present all the desired degrees of elasticity and playing the same part in principle as the links of the arrangements previously described. For that purpose there are utilised for connecting the surfaces adhering to the indiarubber, like those of Figure 13, portions of spherical surfaces in such a way that their respective centres of rotation are situated towards the outside, and come it is to be noted in the mounting in the interior of the engine structure 1 and of the engine 2, the link body being then replaced by a casing or lodgment adhering to the indiarubber by its internal or external faces.

Figure 15:
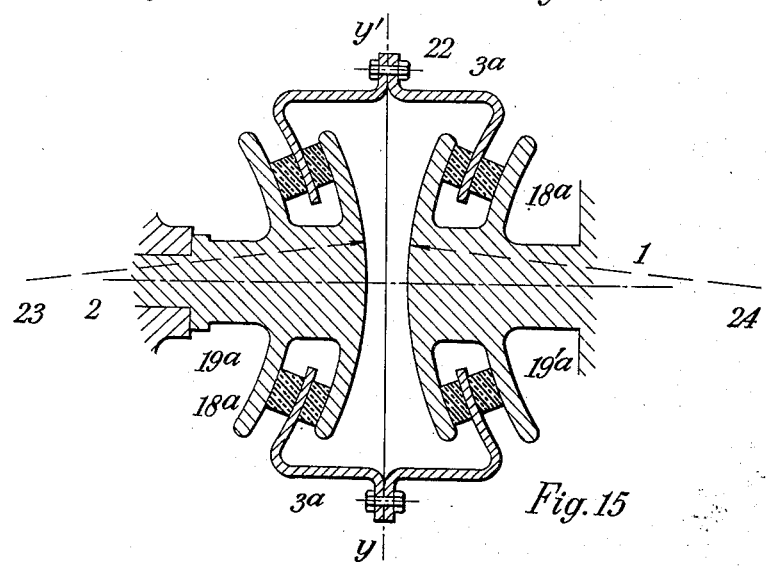
Figure 15 shows a diagrammatic section of a mounting of short length.

An embodiment of such an arrangement is illustrated diagrammatically in Figure 15. The link is in the form of a casing 3a, preferably embodied in two parts arranged close to the mounting and gripped by bolts such as 22. The supports 19a, 19a' are provided with spherical surfaces, with india rubber 18a interposed. The difference, apart from the question of shape, between this arrangement and the parts of Figure 13, resides in the fact that the centres 23 and 24 of the spherical surfaces are external to the link 3a. From the geometrical point of view, it is just as if the link had for its length the distance between the centres 23 and 24, while from the point of view of the space occupied there is the advantage that the said imaginary centres may be placed in the engine 2 and the mounting 1 respectively. From a constructional point of view it will be advantageous to constitute the casing 3a of two shells, united in the plane Y—Y', which can be a plane of symmetry.

Figure 16:
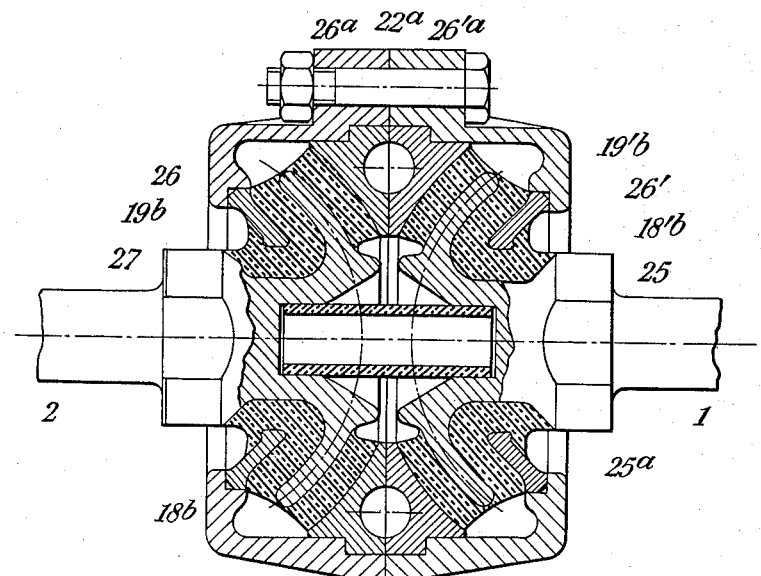
Figures 16 and 17 show the longitudinal section and the end view of an embodiment similar to Figure 15.
Figure 17:
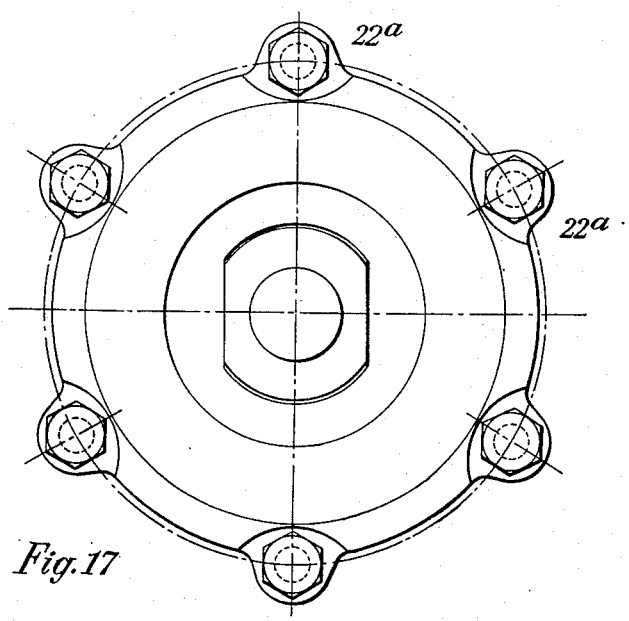

A modification is illustrated in longitudinal section in Figure 16 and in end view in Figure 17. The casing is in two parts 3b and 3b' assembled by a series of bolts such as 22a. This casing here envelops the support 19b and the support 19b' as well as the masses of india rubber 18b and 18b'. Pieces such as 26 and 26', 26a and 26a' fixed in position by the halves of the casing, maintain the masses of india rubber, which adhere to the surfaces facing the spherical surfaces by vulcanisation or by mere block gripping, and which may, as shown, protrude to the outside, to constitute a protection against any entrances of oil.

An internal locking piece is provided, preferably a steel rod 25 sheathed with india rubber 25a, which serves to limit the relative displacement of the two supports 19b, 19b', due to the conical hollows such as 27 provided in the supports. This limitation constitutes one of the points likewise characteristic of the invention.

Figure 18:
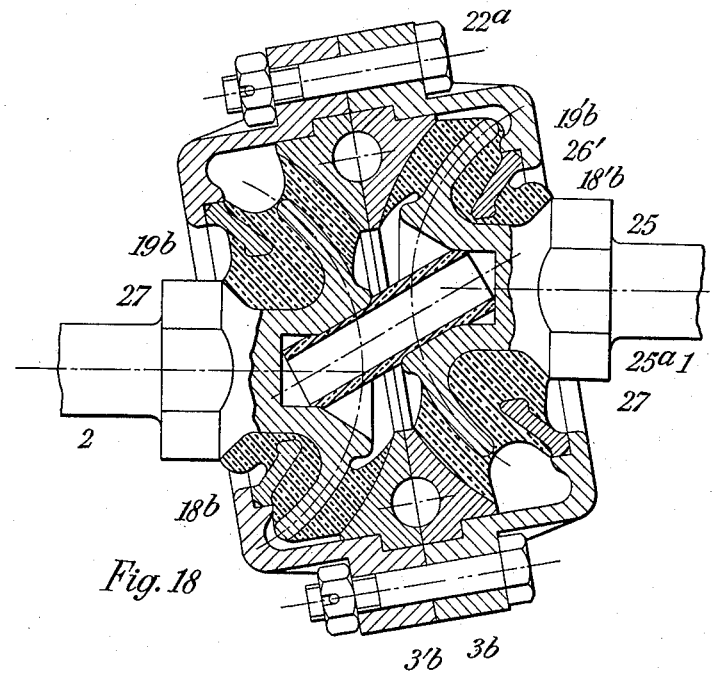
Figure 18 shows the functioning of the suspension system shown in Figure 16 and illustrates the relative displacement.

The functioning of the internal limitation piece 25 can be better seen from Figure 18, in which the two members 1 and 2 are subjected to a relative displacement. The locking piece 25 lodges by its two extremities in the conical hollows such as 27, in the centre of the two pieces 19b and 19b', which are then blocked, when the piece 25 is constrained to take up an inclination equal to half the angle at the apex of the conical hollows, which thus fit over or cap the extremities of the piece 25, the shock being absorbed by the sheath 25a.

Figure 19:
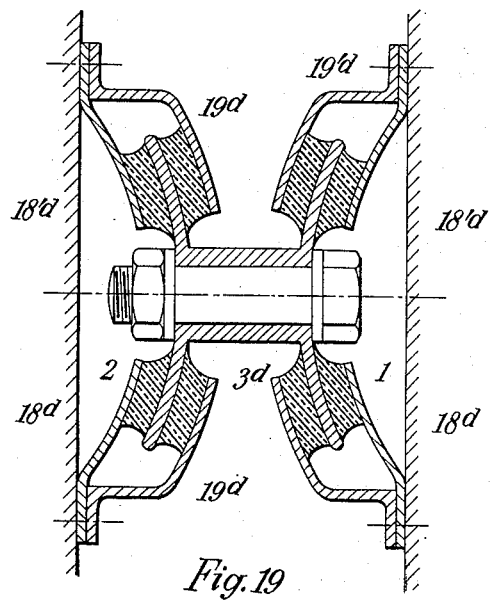
Figure 19 shows a modification of a suspension system similar to that of Figure 15 or 16.

Figure 19 shows diagrammatically a modification having the same properties. The casing link 3d is here axial, and the supports 19d, 19d' which maintain the masses 18d, 18d' are on the contrary concentric.

I claim:

1. A mounting for aircraft engines having link means connected to the engine and to an engine support, said link means comprising a casing, a member rigid with the engine, a second member rigid with the engine support, spaced spherical surfaces on said members, resilient material adhering to said spherical surfaces, means extending from the casing embedded in the resilient material, the centres of said spherical surfaces being remotely situated with respect to the link casing, said link means having a negligible flexibility in a longitudinal direction, and restricting the movement of the engine to a plane perpendicular to the axis of the engine crankshaft and to rotations around an axis perpendicular to said plane.

2. A mounting for aircraft engines having link means connected to the engine and to an engine support, said link means comprising a casing, a member rigid with the engine, a second member rigid with the engine support, means providing spaced spherical surfaces on said members, resilient material adhering to said spherical surfaces and means extending inwardly from the casing engaging said resilient material, the centres of said spherical surfaces being remotely situated with respect to the link casing, said link means having a negligible flexibility in a longitudinal direction, and restricting the movement of the engine to a plane perpendicular to the axis of the engine crankshaft and to rotations around an axis perpendicular to said plane.

3. A mounting for aircraft engines having link means connected to the engine and to an engine support, said link means comprising a casing, a member rigid with the engine, a second member rigid with the engine support, means providing spaced spherical surfaces in said members, resilient material adhering to said spherical surfaces and means extending inwardly from the casing engaging said resilient material, the centres of said spherical surfaces being remotely situated with respect to the link casing, means co-operating with the engine member and with the engine support for limiting the displacement of said members, said means comprising a locking piece having a rubber sheath, said link means having a negligible flexibility in a longitudinal direction and restricting the movement of the engine to a plane perpendicular to the axis of the engine crankshaft and to rotations around an axis perpendicular to said plane.

4. A mounting for aircraft engines having link means connected to the engine and to the engine support, said link means comprising an axially extending member, means extending outwardly from said member having separated spherical surfaces, a member rigid with the engine, a member rigid with the engine support, resilient material adhesively connected to each of said members, and to the outwardly extending spherical surfaces, said link means having a negligible flexibility in a longitudinal direction and restricting the movement of the engine to a plane perpendicular to the axis of the engine crankshaft and to rotations around an axis perpendicular to said plane.

5. A mounting for aircraft engines comprising a plurality of links connected to the engine and to the engine support and normally extending in parallel relationship with the axis of the engine crank shaft, the links being greater in number than two and having a negligible flexibility in a longitudinal direction, and restricting the movement of the engine to a plane perpendicular to the axis of the engine crankshaft and to rotations around an axis perpendicular to said planes, said movements being opposed by resilient means.

MAURICE FRANÇOIS ALEXANDRE JULIEN.